2,497,426

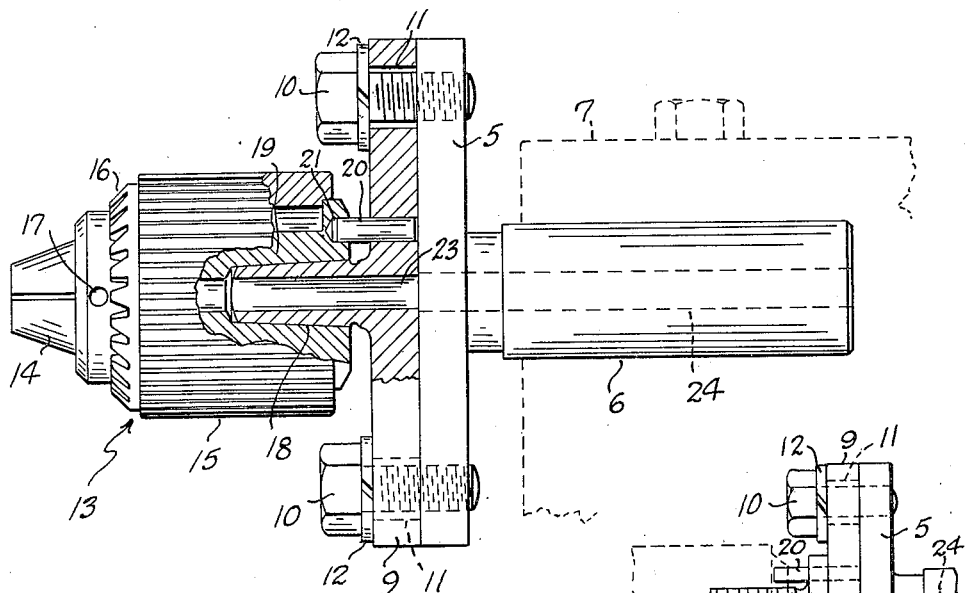
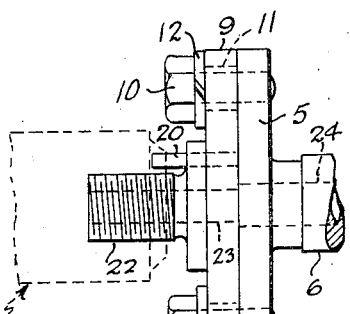
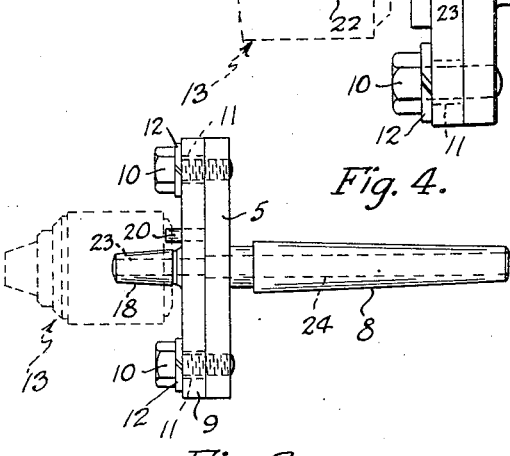
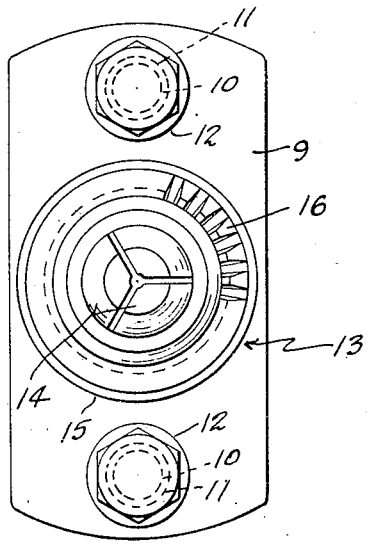
Feb. 14, 1950 — B. P. TOTH — 2,497,426
FLOATING CHUCK ADAPTER
Filed Feb. 28, 1945
Fig. 1.
Fig. 2.
Fig. 3.
Fig. 4.
Inventor
Barnabas P. Toth
By Wooster & Davis
Attorneys Patented Feb. 14, 1950

UNITED STATES PATENT OFFICE 2,497,426

FLOATING CHUCK ADAPTER

Barnabas P. Toth, Bridgeport, Conn., assignor to Barnaby Manufacturing and Tool Company, Bridgeport, Conn., a partnership Application February 28, 1945, Serial No. 580,180

2 Claims. (Cl. 279—6)

This invention relates to a floating chuck adapter, and has for an object to provide a mounting or adapter for complete and standard tool-holding chucks in which the chuck may be adjusted laterally in all directions with respect to the axis of rotation of the work, so that the tool carried by the chuck may be properly centered with respect to the work and the work spindle.

Another object is to provide a device of this character which may be used for mounting different sizes of complete tool-holding chucks to do away with the necessity of employing various sizes of jaws or bushings to hold the tools, such for example as drills, reamers, taps and so forth, and various cutting tools, and therefore, with this adapter it is possible to use chucks of different sizes to take a large range of tools.

With the foregoing and other objects in view I have devised the construction illustrated in the accompanying drawing forming a part of this specification. It is, however, to be understood the device is not limited to the specific details of construction and arrangement shown, but may embody various changes and modifications within the scope of the invention.

In these drawings:

Fig. 1 is a partial side elevation and partial section of the device showing how it may be mounted for use, and also how the complete tool holding chuck may be mounted thereon;

Fig. 2 is a front elevation thereof;

Fig. 3 is a side elevation of the device showing a slight modification, and

Fig. 4 is a similar view of the main portion of the device showing another modification.

This improved tool chuck support or adapter comprises a back plate 5 mounted on a shank 6 extending rearwardly therefrom. This shank may be mounted in any suitable tool holder or mounting, such, for example, as the tool holding turret 7 of a screw machine, automatic lathe and the like. The shank shown is substantially cylindrical or straight, but it may be other types of shank, such for example as a tapered shank, as shown at 8 in Fig. 3.

At the forward side of the back plate 5 is a floating plate 9 which is mounted on the front face of the plate 5 for lateral adjustment in all directions with respect to the axis of the shank 6 and the axis of rotation of the work to be operated upon, so that this plate and the tool holding chuck, and, therefore, the tools carried thereby, may be properly centered and aligned with the work spindle and the work to be operated upon. A simple and effective means for mounting the floating or adjustable plate 9 is by means of a pair of clamping screws 10 threaded into the back plate 5 and passing through openings 11 in the plate 9, which openings are of somewhat larger diameter than the screw, so that the plate may be adjusted laterally in all directions on the plate 5 with respect to the axis of the shank 6, and then clamped in these adjusted positions by means of the screws 10. To prevent the screws loosening up in operation, simple lock washers 12 may be provided.

Extending forwardly from the floating or adjustable plate 9 is means for detachably mounting a complete, standard type of tool-holding chuck 13. This may be of any suitable type now on the market, such, for example, as a so-called "Jacobs" chuck or other similar types, comprising a plurality of clamping jaws 14 adapted to grip a tool, such, for example, as drills, reamers, taps and so forth, and various cutting tools, and which jaws are clamped on the shank of the tool or may be released by rotating an outer sleeve 15, the clamping mechanism not being shown, as it of itself forms no part of the present invention. This sleeve 15 is usually knurled on its outer surface so that it may be rotated by hand, and at its outer edge is also provided with gear teeth 16 by which it may be rotated and securely clamped by means of a small pinion meshing therewith and mounted on a suitable tool provided with a pivot stud to seat in a socket 17, as is well known. In Figs. 1 and 3, the means for mounting the chuck 13 comprises a tapered stud 18 projecting forwardly from the floating or adjustable plate 9 at the center thereof in alignment with the shank 6, which stud is adapted to fit a similarly tapered opening in the body 19 of the chuck 13. As the chuck is seated and forced on this tapered stud it is automatically centered thereon and held by the clamping and friction action of the taper. However, it is preferred to provide some means for locking the chuck against turning on this tapered stud in the working operation of the tool. A simple and effective means for doing this is a pin 20 driven into the plate 9 at one side of the tapered stud 18 and projecting forwardly of the plate 9 to enter a recess or socket 21 in the body of the chuck. This will effectively hold the chuck against turning on the stud.

In Fig. 4 is shown a somewhat modified means of mounting the chuck 13 on the floating plate 9. In this case a threaded stud 22 projects forwardly from the plate in place of the tapered stud 18, and the body 19 of the chuck is provided with a similarly tapped recess to be threaded onto this stud 22. It is held against turning on the stud in operation of the tool by some suitable means, that preferred being a pin 20 similar to that shown in Fig. 1 driven through the plate 9 to seat at its forward end in a recess in the body of the chuck, the same as shown in Fig. 1.

It will be seen that with this device complete or standard chucks 13 of different sizes may be mounted on the same adapter, and that these chucks and the tools carried thereby may be properly centered and lined up with the work by merely loosening the screws 10 and adjusting the plate 9 laterally in any direction, and then clamping it in the centered or adjusted position by tightening the screws 10. In order to permit the use of tools with shanks of different lengths, or permit gripping of the tool at different distances from their free or cutting ends, by the jaws 14 of the chuck, the chuck mounting stud 18 or 22 and the plate 9 are provided with a longitudinal opening 23, and similarly the plate 5 and shank 6 are provided with an aligned opening 24. The opening 24, however, is of somewhat larger diameter than the opening 23 corresponding to the amount the openings 11 are larger than the screws 10, so that with a tool mounted in the chuck with its shank projecting backwardly through the opening 23 into the passage 24 it will not interfere with proper lateral adjustment of the plate 9 and the tool on the back plate 5. Therefore, this adapter will permit the use of tools of various lengths of shanks, and it also permits the use of a knockout rod inserted from the rear end of the shank 6 for either driving a tool from the chuck or removing the chuck from the tapered shank 18. As this device permits the mounting of a whole or complete or standard chuck on the floating or adjustable member 9, the same adapter may be used for all sizes of chucks, and thus chucks may be used of different sizes to take a large range of tools on this same adapter. If a chuck breaks it can be readily removed from the adapter and an entire new chuck quickly placed in position. This greatly cuts down on the number of sizes of holder required, and can be made at less cost, because it can be standardized and the chucks can be made as whole complete units by the usual production methods for such devices, and quickly and easily mounted as such whole complete units on the adapter, doing away with the necessity of using various sizes of jaws or bushings as is commonly employed for holding such tools as drills, reamers, taps and so forth, and various cutting tools. It also permits perfect alignment of the tool with the work spindle for all sizes of chucks and tools.

Having thus set forth the nature of my invention, what I claim is:

1. A chuck adapter of the character described comprising a back plate, a shank extending rearwardly from said plate forming a mounting therefor and adapted to be secured in a tool holder, a floating plate, means for mounting the floating plate on the forward face of the back plate for lateral adjustment in all directions with respect to the axis of the shank and securing it in adjusted positions, a stud projecting forwardly from the floating plate in substantial alignment with said shank and adapted for detachably mounting a complete conventional tool holding chuck on the floating plate, said stud and its plate being provided with a longitudinal passage for the shank of a tool in the chuck, and said back plate and shank being provided with a longitudinal passage in alignment with the first passage and larger than the first passage to permit lateral movement of the tool shank with the floating plate.

2. A chuck adapter of the character described comprising a back plate, a shank extending rearwardly from said plate forming a mounting therefor and adapted to be secured in a tool holder, a floating plate, means for mounting the floating plate on the forward face of the back plate for lateral adjustment in all directions with respect to the axis of the shank and securing it in adjusted positions comprising openings through one of the plates and screws passing through said openings and mounted in the other plate, said openings being larger than the screws to permit said lateral adjustment, a stud projecting forwardly from the floating plate in substantial alignment with said shank and adapted for quickly and readily detachably mounting a complete conventional tool holding chuck on the floating plate, said stud and its plate being provided with a longitudinal passage for the shank of a tool in the chuck, and said back plate and shank being provided with a longitudinal passage in alignment with the first passage and larger than the first passage to permit lateral movement of the tool shank with the floating plate.

BARNABAS P. TOTH.

REFERENCES CITED

The following references are of record in the file of this patent:

UNITED STATES PATENTS

| Number | Name | Date |
|---|---|---|
| 1,051,531 | Whipple | Jan. 28, 1913 |
| 1,222,466 | Railton | Apr. 10, 1917 |
| 1,775,994 | Emrick | Sept. 16, 1930 |
| 2,162,246 | Cote | June 13, 1939 |
| 2,392,809 | Cote | Jan. 15, 1946 |

FOREIGN PATENTS

| Number | Country | Date |
|---|---|---|
| 432,528 | Great Britain | July 29, 1935 |